US006698246B1

(12) United States Patent
Beall et al.

(10) Patent No.: US 6,698,246 B1
(45) Date of Patent: Mar. 2, 2004

(54) METHOD FOR MAKING NANOCRYSTALLINE GLASS-CERAMIC FIBERS

(75) Inventors: George H. Beall, Big Flats, NY (US); Linda R. Pinckney, Corning, NY (US); William D. Vockroth, Corning, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 293 days.

(21) Appl. No.: 09/691,427

(22) Filed: Oct. 18, 2000

Related U.S. Application Data

(60) Provisional application No. 60/160,052, filed on Oct. 18, 1999.

(51) Int. Cl.[7] .............................................. C03B 37/027
(52) U.S. Cl. ............................. 65/390; 65/412; 65/430; 65/33.1; 65/33.4
(58) Field of Search .......................... 65/390, 404, 430, 65/413, 33.1, 33.4, 412

(56) References Cited

U.S. PATENT DOCUMENTS

| | | | | |
|---|---|---|---|---|
| 4,181,515 A | * | 1/1980 | Dyott et al. | 65/385 |
| 4,184,860 A | | 1/1980 | Schneider et al. | 65/3 |
| 4,557,742 A | * | 12/1985 | Thigpen | 65/425 |
| 4,717,238 A | * | 1/1988 | Sakuragi et al. | 385/142 |
| 4,848,998 A | * | 7/1989 | Snitzer et al. | 65/390 |
| 5,244,846 A | * | 9/1993 | Onishi et al. | 501/40 |
| 5,296,012 A | * | 3/1994 | Antos et al. | 65/390 |
| 5,474,588 A | * | 12/1995 | Tanaka et al. | 65/390 |
| 5,537,505 A | * | 7/1996 | Borrelli et al. | 385/142 |
| 5,858,891 A | * | 1/1999 | Auzel et al. | 501/3 |
| 6,197,710 B1 | * | 3/2001 | Ohara et al. | 501/4 |
| 6,374,641 B1 | * | 4/2002 | Chu et al. | 65/385 |
| 6,519,975 B1 | * | 2/2003 | Bange et al. | 65/384 |

FOREIGN PATENT DOCUMENTS

| EP | 186679 | * | 7/1988 |
|---|---|---|---|
| WO | WO 97/16709 | * | 5/1997 |

OTHER PUBLICATIONS

Kingery, W.D. et al. (1976) introduction to Ceramics ($2^{nd}$ ed) Wiley–Interscience, 368–371, 760.*

* cited by examiner

Primary Examiner—John Hoffmann
(74) Attorney, Agent, or Firm—Walter M. Douglas

(57) ABSTRACT

A method for making a glass ceramic, optoelectronic material such as a clad optical fiber or other component for use in an optoelectronic device. The method comprises preparing a glass composition batch to yield a precursor glass for a nanocrystalline glass-ceramic that is doped with at least one kind of optically active ion, such as a transition metal or lanthanide element; melting the batch; forming a glass cane; surrounding the cane with a chemically inert cladding material shaped in the form of a tube; drawing a glass fiber from the combined precursor-glass "cane-in-tube" at a temperature slightly above the liquidus of the precursor glass composition, and heat treating at least a portion of the drawn clad glass fiber under conditions to develop nanocrystals within the core composition and thereby forming a glass ceramic.

15 Claims, 2 Drawing Sheets

Schematic showing the "'viscous'-liquid-in-tube" process.

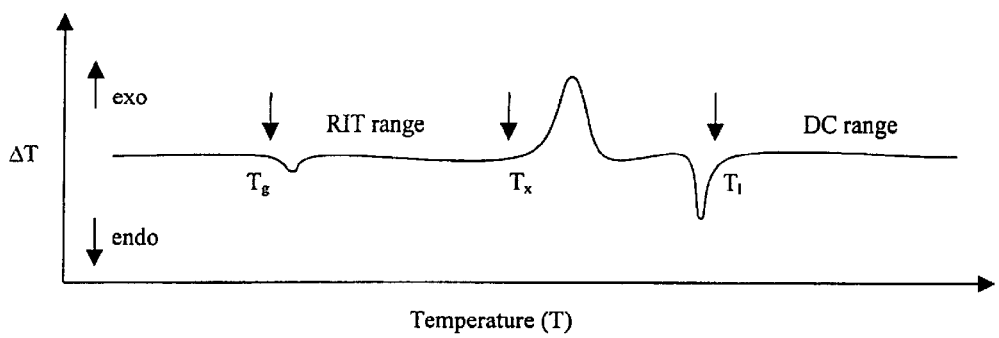
Figure 1A: DTA (differential thermal analysis) curve showing temperature ranges used for Rod-in-tube (RIT) and Double-crucible (DC) fiber-drawing processes, respectively.
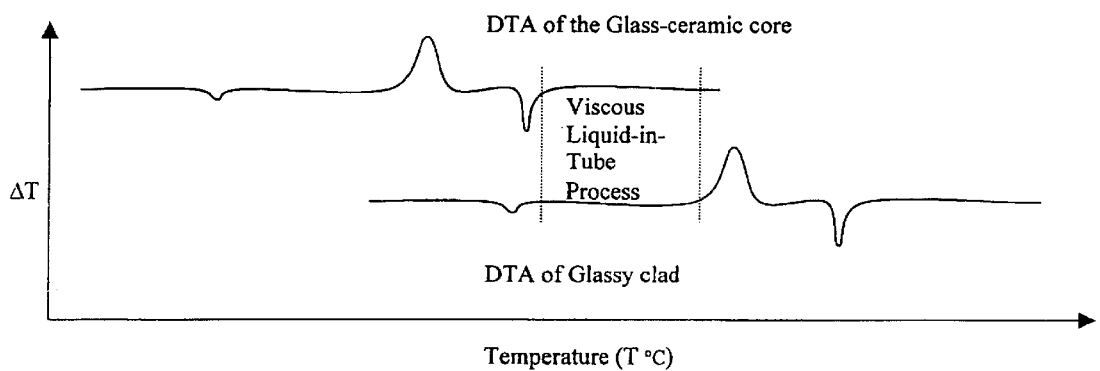
Figure 1B: Schematic showing the "'viscous'-liquid-in-tube" process.

METHOD FOR MAKING NANOCRYSTALLINE GLASS-CERAMIC FIBERS

CLAIM OF PRIORITY

The present application claims the benefit of United States Provisional Application Serial No. 60/160,052, entitled NANOCRYSTALLINE GLASS-CERAMIC FIBERS AND METHOD OF MAKING THEM, filed on Oct. 18, 1999 in the names of George H. Beall, Linda R. Pinckney, William Vockroth and Ji Wang.

FIELD OF THE INVENTION

A method for making glass ceramic, optoelectronic materials that contain nanocrystals that are doped with at least one kind of optically active metal.

BACKGROUND OF THE INVENTION

Over the past few decades, fiber optic systems have become the standard for long-distance communication. This preponderance stems from several advantages of optical links over the more traditional metallic-based counterparts, including lower loss, higher information capacity, low cost per channel, immunity to crosstalk and electrical interference, and a smaller physical mass. Currently, optical fiber systems carry hundreds of terabits per second over distances greater than 1000 km. Even though the capacity of optical fibers is orders of magnitude beyond the capability of metallic links, the demands of global communication are driving the system capacity to double every year.

Transition metals have long been used as optically active dopants in crystalline hosts because they fluoresce in the near infrared (1000–1500 nm) region, while exhibiting a correspondingly large bandwidth. For example, disclosed in U.S. Pat. No. 4,987,575 to Alfano et al. are $Cr^{4+}$ doped crystals that are capable of lasing near 1.3 $\mu$m. Another example is titanium-doped sapphire (Ti:$Al_2O_3$), which provides optical gain in the range of about 650–1100 nm.

Given the useful wavelength range and bandwidth of many transition metal dopants, one can see that their advantageous attributes could be put to good use in telecommunications applications. The crystalline-host transition metal technology of U.S. Pat. No. 4,987,575, however, is not suited for these applications, since the primary optical communications medium is glass-based optical fiber. While a logical extension would be the inclusion of transition metal dopants into glasses, their performance (particularly their efficiency) has unfortunately been found to degrade in amorphous hosts, where the crystal field strength is much smaller than single-crystal hosts. The transition metal ions instead, merely are suspended in the amorphous body providing or contributing little to the amplification or transmission qualities.

Another approach has been considered by Alfano et al. in U.S. Pat. No. 5,717,517, whereby the laser-active $Cr^{+4}$ (or $V^{+3}$)-doped crystal is manufactured as a plurality of particles, to be dispersed in a "non-gaseous" medium. In this manner, the dopants remain laser-active within a crystalline host while the larger, surrounding medium is compatible with fiber optic technology. In order to minimize the optical losses from such a composite medium, both the particles and their index difference from the surrounding medium must be small. These requirements were recognized in the patent by Alfano et al., and the particle size was therefore stipulated to be between 0.05 and 500 $\mu$m, while the index mismatch was specified to be lower than 0.1.

While the concept of dispersing crystalline particles in an amorphous medium is valid, this technology has several severe drawbacks, primary of which is the manufacture of the microscopic particles and their uniform distribution in a suitable matrix. Certainly the loss decreases with particle size, and the smallest particles (0.05 $\mu$m) are therefore desirable. Grinding of material generally has difficulty producing particles smaller than 1 $\mu$m however, and even the sol-gel method of producing forsterite has trouble attaining particles smaller than this size. While some techniques have attained particles on the 0.5 $\mu$m scale, another order of magnitude smaller seems difficult to achieve. Even allowing for the smallest particle size of 0.05 $\mu$m, a simple analysis of the scattering losses reveals another major shortcoming of this technique.

To overcome the shortening of the aforementioned materials and techniques, we describe a method for making glass-ceramic optical fibers. Glass ceramics have the advantage described in a United States patent application entitled TRANSITION-METAL GLASS-CERAMIC GAIN MEDIA, filed in the name of George H. Beall, Nicholas F. Borrelli, Linda R. Pinckney, Eric J. Mozdy, on Oct. 11, 2000, which is incorporated by reference in its entirety, herein. The process of internal nucleation forms a glass ceramic, where the crystalline sites are small and uniformly distributed throughout the glass core. The crystals are formed from constituent materials of the original glass melt, not by introducing new materials as disclosed in U.S. Pat. No. 5,717,517. Moreover, the optically active dopants are introduced throughout the entire medium, as compared to only scattered particles.

When making an optical fiber from glass ceramic materials, the nature of a glass-ceramic material generally necessitates drawing the material as a glass fiber and subsequently subjecting the fiber to an appropriate thermal treatment to develop the crystalline phase. Most glass-ceramic fibers, currently known, are made by using a "double-crucible method". Accordingly, it has become customary to employ an apparatus known as a double crucible in drawing glasses to be converted to a glass-ceramic. The double crucible embodies a central tube for the core glass of a fiber. A larger diameter tube, surrounding the central tube, delivers the cladding glass. The respective glasses are maintained in a molten state in their crucibles, and flow from the tubular outlets to be drawn as a clad fiber.

In drawing optical fibers from glass-ceramic compositions, the most critical issue of concern is how to suppress the intense tendency of the compositions to crystallize as the glass is processed when attempting to form a glassy fiber. This phenomenon is due to the fact that the compositions for the precursor glass for a glass-ceramic, particularly the high temperature glass-ceramics useful for present purposes, are purposely designed to crystallize. Accordingly, in drawing a clad glass for present purposes, a critical problem is how to suppress this intense tendency to crystallize, thereby maintaining the fiber as a glass.

We have found various drawbacks in using the double crucible method. But the major shortcoming of this approach that the present invention is directed to ameliorate is the propensity of the respective glass components to undergo strong chemical inter-diffusion and/or interaction between the core material and the cladding material, because both glasses are in a fairly fluid or liquid state. Both the core and clad composition typically contain siginificant amounts of monovalent and divalent ions, which are likely to migrate across the core-clad interface. Diffusion problems may seriously alter the composition of the core glass-ceramic, and even render it incapable of being cerammed in a subsequent thermal treatment.

Hence, a problem exists that the present invention is directed to solving. The invention provides a method to minimize cross-diffusion between the core and cladding materials during the optical fiber manufacturing process. The method described in this application is a very different method of fiberizing a glass-ceramic material, which offers certain advantages particularly with respect to the cladding, described below, and is the preferred fiberization method for certain glass ceramic compositions.

SUMMARY OF THE INVENTION

The present invention resides in a method to produce clad optical fiber and other materials for optoelectronic applications, including lasers and amplifiers, without having to suffer unnecessarily, when forming and drawing optical fiber, contamination of the fiber core by the cladding material. More particularly, the invention provides a unique method for making an optoelectronic material by modifying the "rod-in-tube" process to produce a clad optical fiber. Diffusion of contaminant elements into the precursor glass compositions for the glass-ceramic fiber core is kept to a minimum. Maintaining the purity of the core and its transparency to light is useful and favored in optoelectronic applications. The method can best be described as a "viscous-liquid-in-tube" process, wherein precursor glass compositions for making glass-ceramic materials that contain nanocrystals doped with optically active ions are employed with a more refractory or temperature resistant cladding material. According to the inventive method, a precursor glass composition is first prepared and formed into a cane. Second, a chemically inert cladding material comprising, for example, modified silica is formed into a tube that is fitted around the glass cane. Third, a glass fiber is drawn from the combined precursor-glass-cane-intube at a temperature slightly above the liquidus of the fiber-core glass composition, and subsequently at least a portion of the drawn clad glass fiber is heat treated to develop nanocrystals within the core composition, thereby forming a glass ceramic.

BRIEF DESCRIPTION OF THE DRAWINGS

FIG. 1A. A differential thermal analysis (DTA) curve showing temperature ranges used for current Rod-in-Tube (RIT) and Double-Crucible (DC) fiber-drawing processes, respectively.

FIG. 1B. Differential thermal analysis (DTA) curves indicating the respective areas of formative regions of glass-ceramic fiber fiberization used in creating the present invention, a "viscous" liquid-in-tube process.

DESCRIPTION OF THE INVENTION

Figure 2:
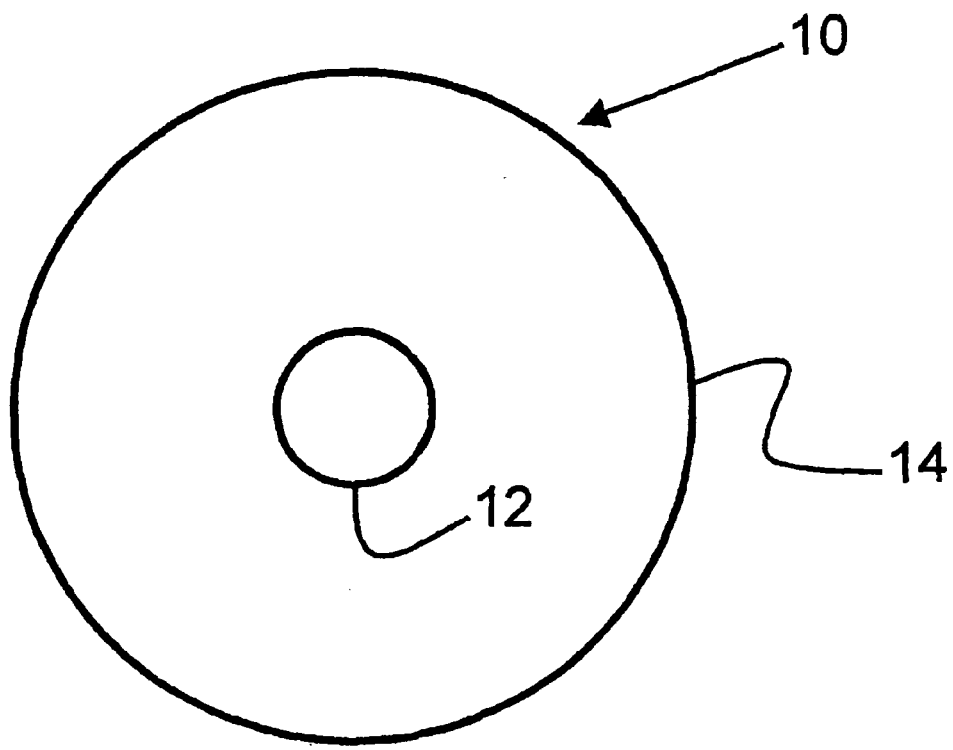
FIG. 2. A cross-sectional view of a clad optical fiber in accordance with the present invention.

The previous method of drawing optical fibers from most glass-ceramic compositions, as mentioned before, involved using a double-crucible. This method tends to exacerbate contamination of the precursor glass composition used in the fiber core by the cladding material. Contamination would substantially alter the composition of the later formed glass-ceramic material of the core. In the present invention, we propose an original method to produce clad optical fiber and other optoelectronic devices used in telecommunications. The invention is described with reference to a clad optical fiber as a component in optoelectronic devices such as lasers and amplifiers where it presently finds application. However, it is not necessarily so limited, and those skilled in the art of clad materials will no doubt readily see other applications.

The invention involves using the thermal properties of materials in a way to produce transparent glass-ceramic fiber cores in combination with a durable cladding. FIGS. 1A and 1B illustrate the thermodynamic principles involved in the invention. In contrast to currently employed "rod-in-tube" draw processes that operate in a lower temperature range, between the glass transition temperature ($T_g$) and crystallization temperature ($T_x$) as shown in FIG. 1A, the present inventive process occurs at a higher temperature. At temperatures lower than those used in the present invention, the glass composition of the core tends to devitrify, often forming crystals too large to permit effective light transmission. It is, therefore, desirable to avoid any uncontrolled crystallization in the glass fiber as it is being drawn and clad. Crystal formation at an early stage of manufacture is inopportune and can cause many complications latter on. The glass composition of the core should remain glassy at this stage of production. As can be seen in FIG. 1B, to completely avoid crystallization of the glass-ceramic composition when making a preform draw, the draw should be carried-out at a temperature just above the liquidus temperature ($T_l$) of the candidate glass-ceramic material that will be used as the core of a fiber. At the other temperature extreme, suitable for current double crucible processes, the outer cladding material may become too soft and compositional species may become mobile. Thus, as described before, too much chemical reaction occurs between the core and clad compositions. A material for cladding that can withstand higher temperatures and that is unlikely to chemically react or diffuse with the core glass composition is used to surround the fiber core before drawing begins. Thus, the new method entails essentially a shifting of the respective temperature dynamics for the core and cladding materials. In other words, even though both materials are subjected to the same temperature during the draw process, the temperature is slightly above the liquidus temperature ($T_l$) of the glass in the core, while simultaneously remaining below the kinetically-controlled crystallization temperature ($T_x$) of the much more viscous cladding glass. This process can also be described as a conceptual hybrid between the rod-in-tube and the double crucible methods.

FIG. 2 is a cross-sectional view of a clad fiber in accordance with the present invention. In the Figure, a clad fiber is designated by the numeral 10. Clad fiber 10 comprises a core fiber 12 having a cladding layer 14 deposited on the surface of fiber 12 and encasing it. Dimensions are considerably exaggerated in the interest of clarity.

The fiber core 12 is made from a high temperature glass-ceramic material having a liquidus-viscosity in the range of approximately from 100–200–2500 poises. Although the viscosity of the glass core composition at liquidus temperature may be low by conventional glass standards, the core material nevertheless has a sufficiently high viscosity at the liquidus temperature to minimize diffusion of component elements. Glass ceramic compositions that can work well with the inventive method of making fiber typically have a softening point above about 900° C. Specific examples of these kinds of glass compositions include a substantially transparent, alpha- and beta-willemite glass-ceramic, which may be doped with transition-metals to impart optical activity, as disclosed in a United States patent application entitled GLASS- CERAMICS BASED ON ALPHA- AND BETA-WILLEMITE, filed in the name of Linda R. Pinckney, and assigned to the same assignee as this application; or, transition-metal-doped, glass-ceramic materials that exhibit properties that make them suitable as gain media in optical amplifiers and/or laser pumps, as described in a United States patent application entitled TRANSPARENT (LITHIUM, ZINC, MAGNESIUM) ORTHOSILICATE GLASS-CERAMICS, filed in the names of George H. Beall and Linda R. Pinckney, and also assigned to the same assignee as this application. Both of these patent applications were filed on Oct. 11, 2000, and are incorporated by reference herein in their entirety. These glass ceramic compositions are characterized in that the defining crystal phase (s) is nanocrystalline in nature, that is, the crystals can range from being not larger than about 50 nm in diameter, to 25 nm to, 10 nm or even as small as 5 nm. Further, these compositions are doped with at least one kind of optically active ion. Optically active ions for example may be chosen from either the transition metals or the lanthanide elements.

Transition-metal doped nanocrystalline glass-ceramics are a unique class of novel laser and optical amplifying material used for optoelectronic applications. More particularly, applicable transition metal dopants can include titanium (Ti), vanadium (V), chromium (Cr), manganese (Mn), cobalt (Co), nickel (Ni), copper (Cu), or even iron (Fe). Glass ceramic materials doped with transition metal ions preserve not only their typical broad-emission characteristics, but also tend to show high, crystal-like quantum yield as compared to similarly-doped amorphous, pure glass hosts. Thus, they provide the advantages of a pure crystal in terms of spectroscopic characteristics. At the same time, they provide the advantages of a glass insofar as material processing is concerned. A similar effect is noticed when lanthanide elements, for example, erbium (Er), thulium (Tm), neodymium (Nd), praseodymium (Pr), or ytterbium (Yb), dysprosium (Dy), holmium (Ho) are doped into the glass-ceramic.

In some cases, a small amount of alkali or halogen ions in the core material may be lost and this may be easily compensated by adding a little extra amount of the volatile components in the starting batches of the core glass composition.

A conmmon practice in optical fiber production is to apply a cladding layer to the optical fiber core. This cladding layer surrounds the fiber as shown by cladding layer 14 in FIG. 2. This cladding layer serves to maintain an optical signal within the fiber core, since it is lower in refractive index than the core. To avoid stress and potential cracking, however, the cladding should provide a close match in coefficient of thermal expansion (CTE) with the core. Preferably, the CTE of the cladding will be slightly lower than that of the core to thereby induce a small compressive stress and lend a source of mechanical strength.

The question then becomes what guidelines dictate the cladding material to be chosen for use in our invention. We believe that our invention satisfies the following two concerns when choosing a suitable cladding material for optical fiber. First, and foremost, the cladding material should exhibit relatively high viscosity and the absence of significant amounts of mobile species $R^+$, $R^{2+}$ in the cladding, so as to minimize diffusion rates of the elements in the core material. This characteristic reduces the amount of cross diffusion between the core and cladding materials. Yet, the cladding should be soft enough and drawable before the core material becomes too molten, soft, or volatile. In other words, the cladding must be sufficiently viscous at the drawing temperature to permit it to be drawn, while the core glass should remain compositionally stable, that is, have a sufficiently low vapor pressure to avoid appreciable volatility. According to the inventive method, the ratio of the viscosity of the cladding to the viscosity of the core is about three orders of magnitude, (cladding:core $\sim 10^6:10^3$), so as to minimize diffusion.

The liquid core material should remain as a viscous liquid, having as low a vapor pressure as possible. Second, at the same time, the cladding should be chemically inert with respect to the glass of the core. That is, the cladding material reacts only minimally, if at all, with the viscous-liquid core.

A cladding material that satisfies these two concerns can comprise a composition of predominantly silica modified with additives. Suitable additives for modifying silica include oxides of boron (B), germanium (Ge), phosphorous (P), aluminum (Al), gallium (Ga), tantalum (Ta), titanium (Ti) and antimony (Sb). These oxide additives are oxides known as conditional glass-forming oxides with silica, and any one of which may be used singly or in combination with another.

Silica materials modified with these elements, but particularly B, Ge, and/or P, exhibit several relevant characteristics. First, no-bridging oxygen exists in these cladding materials and all bonds are fully saturated, thus these materials exhibit strong chemically inert properties. The B, Ge and P oxides are preferred, with the B and Ge being slightly favored. Phosphorous is more effective in decreasing the softening point, but its double bond may leave bigger voids in the glass structure. These voids may permit entry of alkali ions, thereby lessening the chemically inert properties of the cladding. In general, alkali metal and alkaline earth metal oxides are avoided to the extent feasible. These compounds tend to reduce chemical inertness and tend to unduly lower the glass softening point.

Second, by avoiding alkali and alkaline earth metal oxides, the softening points of these materials can be varied greatly ranging from about 1200° C. to as high as that of pure silica, depending on the requirements of the compositional nature of the core material. A high softening temperature provides, according to an embodiment of the inventive method, a drawing temperature that is slightly above the liquidus temperature of the core composition. Third, high temperature glass-ceramics may have coefficients of thermal expansion in the range of about $10$–$90 \times 10^{-7}/°$ C., but more often within the range of $20$–$70 \times 10^{-7}/°$ C., or $30$–$60 \times 10^{-7}/°$ C. The cladding material used will then preferably have a somewhat lower CTE than that of the core glass. For example, the cladding then can have a CTE in the range of about $5$–$70 \times 10^{-7}/°$ C., or in the range of $15$–$60 \times 10^{-7}/°$ C. but more likely within $15$–$25 \times 10^{-7}/°$ C. As stated before, the differential between coefficients of thermal expansion provides compressive stress that helps strengthen the clad fiber.

One other favorable feature of the inventive method is the fiber produced is compatible with silica-based fiber technology and is easily fusion spliced, since the cladding contains high amounts of silica.

In other methods such as cullet-in-tube, when substantial time is required to heat and melt the cullet, a great amount of diffusion can occur with the cladding. Since the core material employed in the inventive method is already a nicely formed glass material, the tendency for diffusion of component elements is reduced.

Having discussed the nature of the nanocrystalline, glass-ceramic core, and modified-silica cladding materials, it is easier to understand our new method for fiberization. The method is similar to a "rod-in-tube" approach, yet substantially different because the inventive method makes better use of the thermal properties of these materials. As touched upon before, it is clear that fiber drawing according to our invention should generally be carried out at a temperature just above the liquidus temperature of the glass fiber core. This is not to disavow that if the kinetics of crystallization are sufficiently slow, however, the fiber can be drawn at a temperature below the liquidus temperature of the core glass. Additionally, the more refractive nature of the modified silica cladding can withstand much higher temperatures than previous cladding materials used in the conventional rod-in-tube approach. In our inventive method, a clad glass fiber is first produced by drawing a cane from the precursor glass and cladding it with a cladding of modified silica, as described above. The modified silica tube is preferably fabricated by an outside chemical vapor deposition (CVD) process such as OVD or VAD, but traditional fusion or flame process may be employed as well. CVD produced modified silica cladding tends not to contain monovalent or divalent ions. Cladding may be attached to the core in a mechanical process by placing the core within the cladding. As shown in FIG. 1B, the drawing process occurs at a temperature that is above liquidus for the core, and below crystallization for the cladding. The clad glass fiber is drawn and then subjected to an appropriate thermal treatment to crystallize either during the drawing process or, more commonly, in a subsequent step.

Thus to recapitulate, our invention is in part a method for making an optoelectronic material. The method comprises several steps: a) preparing a glass composition to yield a precursor glass for a nanocrystalline glass ceramic doped with at least one kind of optically active ion; b) forming the precursor glass into a glass cane; c) incorporating the glass cane with a chemically inert cladding material, preferably made from modified silica; d) making an optical component, such as a fiber, from the combined glass cane and cladding at a temperature slightly above the liquidus temperature of the relatively more fluid, precursor glass, and below the kinetic crystallization temperature of the viscous cladding (glass) material; e) heat treating at least a portion of the optical component to develop nanocrystals within the precursor glass. The optically active dopant is selected from transition metals and lanthanides. The nanocrystals formed in the glass ceramic are not larger than about 50 nm, and may be as small as 5 nm, in size.

In the making of a glass optical fiber according to the inventive method, the cladding glass is sufficiently viscous at the drawing temperature to permit it to be drawn at a temperature where the core glass is chemically stable even though more fluid than the cladding. The cladding-glass batch is made as a tube formed by a chemical vapor deposition process. The cladding glass is adapted to provide a glass containing essentially silica modified by at least one modifying oxide selected from the group composed of B, Ge, P, G, Al, Ta, Ti, or Sb oxides. The cladding glass, thus modified has a softening point of at least 900 to 1000° C., alternatively 1200° C., or even as high as pure fused silica (1640–1650° C.).

Moreover, the optical fiber produced according to the method comprises a nanocrystalline glass-ceramic fiber core surrounded by a cladding, such that chemical migration of component elements between the core and cladding glasses are minimized by controlling compositional and thermal parameters of the fiberization process and the core and cladding materials. Further, the migration of component elements is reduced such that the refractive interface between the core and cladding does not adversely affect transmission and waveguiding in the core. The fiber core has a coefficient of thermal expansion in the range of about $10-90\times10^{-7}/°$ C., and the cladding material has a coefficient of thermal expansion in the range of about $5-70\times10^{-7}/°$ C.

Our experiments to date show the method to work very well and have produced, under experimental conditions, satisfactory, ceramable, optical fibers that have the correct emission spectra of transition metal ions for interesting optical communication applications. Although a preferred embodiment of the invention has been disclosed in detail for the purpose of illustration, those skilled in the art can appreciate that variations or modifications may be made thereof and other embodiments may be perceived without departing from the scope of the invention, as defined by the appended claims and their equivalents.

We claim:

1. A method of making a glass ceramic material suitable for optoelectronic applications, said method comprising:
    a) preparing a glass composition to yield a precursor glass, doped with at least one selected optically active ion, for a nanocrystalline glass ceramic the precursor glass having a crystallization temperature;
    b) forming the doped precursor glass into a glass cane;
    c) surrounding the glass cane with a chemically inert cladding material to thereby form a clad glass cane having the doped precursor glass as the core;
    d) forming from the clad glass cane an optical component at a temperature above the crystallization temperature of the doped precursor glass; and
    e) heat treating at least a portion of the optical component to develop nanocrystals within the doped precursor glass, thereby forming said heat treated portion into a glass ceramic material suitable for optoelectronic applications;

wherein the glass ceramic material suitable for optelectronic applications is in the form of a clad optical fiber, and wherein the glass-ceramic material forms the core of the optical fiber, the core having a CTE in the range of $10-90\times10^{-7}/°$ C., and the cladding having a CTE in the range of $5-70\times10^{-7}/°$ C.

2. The method in accordance with claim 1, wherein the at least one selected optically active ion is selected from the group consisting of transition metal ions and lanthanide metal ions.

3. The method in accordance with claim 2, wherein the transition metal ions with which the glass-ceramic is doped are selected from the group consisting of Ti, V, Cr, Mn, Co, Ni, Cu, and Fe.

4. The method in accordance with claim 3, wherein the transition metal ions with the glass-ceramic is doped are selected from the group consisting of Cr, Ni, and Co.

5. The method in accordance with claim 2, wherein the lanthanide metal ions with which the glass-ceramic is doped are selected from the group consisting of Er, Tm, Nd, Pr, Yb, Dy, and Ho.

6. The method in accordance with claim 1, wherein the nanocrystals are not larger than about 50 nm in size.

7. The method in accordance with claim 1, wherein the optical fiber cladding is a silica glass modified by at least one oxide selected from the group consisting of B, Ge, P, Ga, Al, Ta, Ti, and Sb oxides.

8. The method in accordance with claim 7, wherein the optical fiber cladding is a silica glass modified by an oxide selected from the group consisting of $B_2O_3$, $GeO_2$, and $P_2O_5$.

9. The method in accordance with claim 1, wherein the glass-ceramic core has a CTE in the range of $20-70\times10^{-7}/°C$, and the cladding has a CTE in the range of $15-60\times10^{-7}/°C$.

10. A method of making a nanocrystalline glass ceramic optical fiber having a core that is doped with at least one selected optically active ion, the method comprising:
   a) forming a precursor glass cane;
   b) creating a cladding material of modified silica;
   c) combining the precursor glass cane into the cladding material;
   d) drawing the combined precursor glass cane and cladding material at a temperature above the crystallization temperature of the precursor glass, and below the kinetic crystallization temperature of the cladding material;
   e) heat treating the draw clad fiber under conditions that promote nanocrystal formation within the core to form a glass ceramic.

11. A method of producing a clad optical fiber, the method comprises melting a batch to yield a precursor glass for a nanocrystalline glass-ceramic that is doped with a transition metal, forming a glass cane from the precursor glass melt, mechanically incorporating the glass cane into a cladding tube, drawing a composite glass fiber at room temperature slightly above the liquidus temperature of the drawn composite glass fiber, and subsequently heat treating at least a portion of the clad glass fiber under conditions to develop nanocrystals therein.

12. The method in accordance with claim 1 or 11, which further comprises applying to the glass fiber a cladding glass that is sufficiently viscous at the drawing temperature to permit it to be drawn at a temperature where the core glass, though fluid, and has a sufficiently low vapor pressure to avoid appreciable volatilization.

13. The method in accordance with claim 1 or 11, which further comprises forming the cladding glass by a chemical vapor deposition (CVD) process.

14. The method in accordance with claim 1 or 11, which further comprises cladding the glass fiber with a batch adapted to provide a glass consisting essentially of silica and at least one modifying oxide, the glass thus provided having a softening point of at least about 900° C.

15. The method in accordance with claim 14, which further comprises cladding the fiber with a glass having a composition consisting essentially of silica and at least one oxide selected from the group consisting of B, Ge, and P.

* * * * *